US008677768B2

(12) United States Patent
Lemay

(10) Patent No.: US 8,677,768 B2
(45) Date of Patent: Mar. 25, 2014

(54) SYSTEM AND METHOD FOR PURIFYING A FIRST LIQUID CONTENT AND SIMULTANEOUSLY HEATING A SECOND LIQUID CONTENT

(75) Inventor: Patrick Lemay, Sherbrooke (CA)

(73) Assignee: Innovel 2000 Inc., Sherbrooke, Quebec (CA)

( * ) Notice: Subject to any disclaimer, the term of this patent is extended or adjusted under 35 U.S.C. 154(b) by 171 days.

(21) Appl. No.: 13/511,517

(22) PCT Filed: Dec. 3, 2010

(86) PCT No.: PCT/CA2010/001901
§ 371 (c)(1),
(2), (4) Date: May 23, 2012

(87) PCT Pub. No.: WO2011/066642
PCT Pub. Date: Jun. 9, 2011

(65) Prior Publication Data
US 2012/0279253 A1 Nov. 8, 2012

(30) Foreign Application Priority Data
Dec. 5, 2009 (GB) .................................. 0921315.8

(51) Int. Cl.
*F25D 3/12* (2006.01)
(52) U.S. Cl.
USPC .............................................. 62/56; 62/545
(58) Field of Classification Search
CPC ..................................... B01D 9/00; C02F 1/22
USPC ....................... 62/56, 545, 535, 532, 536, 533
See application file for complete search history.

(56) References Cited

U.S. PATENT DOCUMENTS

| 1,969,187 | A | 8/1934 | Schutt |
| 2,340,721 | A | 2/1944 | Whitney |
| 2,666,304 | A | 1/1954 | Ahrel |
| 2,696,717 | A | 12/1954 | Lindenberg et al. |
| 2,896,419 | A | 7/1959 | Thompson |
| 2,949,019 | A | 8/1960 | Roberts |
| 3,017,751 | A | 1/1962 | Hawkins |
| 3,069,864 | A | 12/1962 | Crosby |
| 3,098,733 | A | 7/1963 | Rosenstein et al. |
| 3,098,735 | A | 7/1963 | Clark |
| 3,137,554 | A | 6/1964 | Gilliland et al. |
| 3,170,778 | A | 2/1965 | Roth |
| 3,192,726 | A | 7/1965 | Newton |

(Continued)

FOREIGN PATENT DOCUMENTS

| CA | 1268046 A1 | 4/1990 |
| CN | 201034026 Y | 3/2008 |

(Continued)

*Primary Examiner* — Mohammad M Ali
(74) *Attorney, Agent, or Firm* — IPAXIO S.E.N.C.

(57) ABSTRACT

The system includes a first heat exchanger in which the refrigerant is injected directly into the content of the first liquid circuit through at least one nozzle to simultaneously capture latent heat from the content as purified frozen liquid pieces are formed. It also includes a second heat exchanger in which the refrigerant transfers the latent heat captured from the content of the first liquid circuit to a content of the second liquid circuit, thereby raising the content of the second liquid circuit in temperature. The proposed concept provides designers with opportunities to create highly efficient systems and methods where the latent heat extracted for the purification is immediately employed to a useful purpose.

21 Claims, 3 Drawing Sheets

(56) References Cited

U.S. PATENT DOCUMENTS

| | | | | |
|---|---|---|---|---|
| 3,214,928 | A | 11/1965 | Oberdorfer | |
| 3,247,678 | A | 4/1966 | Mohlman | |
| 3,251,192 | A | 5/1966 | Rich et al. | |
| 3,338,065 | A | 8/1967 | Ashley | |
| 3,390,537 | A | 7/1968 | Callen | |
| 3,393,528 | A | 7/1968 | Endress | |
| 3,425,235 | A | 2/1969 | Cox | |
| 3,751,358 | A | 8/1973 | Elliott | |
| 4,018,682 | A | 4/1977 | Boyer | |
| 4,046,534 | A | 9/1977 | Maguire, Sr. | |
| 4,055,053 | A | 10/1977 | Elfving et al. | |
| 4,078,392 | A | 3/1978 | Kestner | |
| 4,199,961 | A | 4/1980 | Carter et al. | |
| 4,253,309 | A | 3/1981 | Abrahamsson et al. | |
| 4,283,211 | A | 8/1981 | Ehrlich et al. | |
| 4,373,345 | A | 2/1983 | Tyree, Jr. et al. | |
| 4,379,390 | A | 4/1983 | Bottum | |
| 4,489,567 | A | 12/1984 | Kohl | |
| 4,538,428 | A | 9/1985 | Wilkerson | |
| 4,581,052 | A * | 4/1986 | Adler et al. | 62/535 |
| 4,593,538 | A | 6/1986 | Borde et al. | |
| 4,671,077 | A | 6/1987 | Paradis | |
| 4,705,624 | A * | 11/1987 | Thijssen | 210/96.1 |
| 4,799,945 | A | 1/1989 | Chang | |
| 4,838,039 | A | 6/1989 | Knodel | |
| 4,840,652 | A | 6/1989 | Simon et al. | |
| 4,864,831 | A * | 9/1989 | Hino | 62/123 |
| 4,899,548 | A | 2/1990 | Dimijian | |
| 4,914,921 | A * | 4/1990 | Knodel | 62/59 |
| 5,100,562 | A * | 3/1992 | Proctor | 210/774 |
| 5,207,761 | A | 5/1993 | Ruff | |
| 5,218,828 | A * | 6/1993 | Hino | 62/59 |
| 5,307,646 | A | 5/1994 | Niblock | |
| 5,409,505 | A * | 4/1995 | Morita et al. | 23/295 R |
| 5,438,843 | A | 8/1995 | Conlon | |
| 5,564,289 | A | 10/1996 | Hino | |
| 6,038,869 | A | 3/2000 | Lee et al. | |
| 6,050,083 | A | 4/2000 | Meckler | |
| 6,336,334 | B1 * | 1/2002 | Minkkinen et al. | 62/123 |
| 6,415,628 | B1 * | 7/2002 | Ahmed et al. | 62/534 |
| 6,807,813 | B1 | 10/2004 | Lesage | |
| 6,902,838 | B2 * | 6/2005 | Lee et al. | 429/438 |
| 7,003,974 | B1 | 2/2006 | Brooks | |
| 7,067,211 | B2 * | 6/2006 | Lee et al. | 429/429 |
| 7,438,807 | B2 | 10/2008 | Garner et al. | |
| 7,900,373 | B2 * | 3/2011 | Reitinger | 34/381 |

FOREIGN PATENT DOCUMENTS

| | | |
|---|---|---|
| GB | 1371027 | 10/1974 |
| RU | 2223832 C2 | 2/2004 |
| WO | 0029792 A2 | 5/2000 |
| WO | 2004045738 A2 | 6/2004 |
| WO | 2004046624 A1 | 6/2004 |
| WO | 2008153946 A2 | 12/2008 |

* cited by examiner

SYSTEM AND METHOD FOR PURIFYING A FIRST LIQUID CONTENT AND SIMULTANEOUSLY HEATING A SECOND LIQUID CONTENT

CROSS-REFERENCE TO RELATED APPLICATIONS

This application is a national stage filing under Section 371 of International Patent Application No. PCT/CA2010/001901 filed on 3 Dec. 2010 and published in English as WO 2011/066642 A1 on 9 Jun. 2011. PCT/CA2010/001901 claims priority to Patent Application Serial No. 0921315.8 filed on 5 Dec. 2009 in the United Kingdom. The entire contents of PCT/CA2010/001901 and U.K. Patent Application No. 0921315.8 are incorporated herein by reference in their entirety.

TECHNICAL FIELD

The technical field relates generally to open geothermal heat pump systems.

BACKGROUND

Minimizing energy consumption is highly desirable whenever the costs of energy can have a direct impact on the overall operating costs of a system. Very often, minimizing energy consumption also reduces carbon footprint.

There are different possible approaches for minimizing energy consumption. One approach is to use more efficient machines and method for extracting energy from an available heat source. Heat pumps systems are one example of machines following this approach when applied to heating. In these systems, heat from a first medium is captured using a refrigerant circulating in a cold side and a second medium is heated using the same refrigerant circulating in a hot side. Heat pump systems are also well known for use in refrigerators or air conditioning systems.

Still, heat pump systems can be used for freezing a liquid, for instance water, in order to purify it. When water freezes, it forms substantially pure ice crystals. Over the years, this characteristic was used for different purposes, such as the recovery of fresh water from salt water or for treating effluents from industrial processes. Examples of systems are disclosed in U.S. Pat. No. 3,098,735 issued on 23 Jul. 1963 to Clark, U.S. Pat. No. 3,137,554 issued 16 Jun. 1964 to Gilliland et al., U.S. Pat. No. 3,338,065 issued 29 Aug. 1967 to Ashley, and U.S. Pat. No. 4,199,961 issued on 29 Apr. 1980 to Carter et al., to name just a few.

Some heat pump systems were designed for extracting latent heat released when liquid water freezes in their cold side. When freezing, liquid water goes through a phase change and releases about 335 KJ of latent heat per kilogram of water. This represents about 15 times more energy than using only sensible heat from cold liquid water. As an added benefit, less water is required. However, one of the challenges of ice-generating heat pump systems is the relative complexity involved in operating them on a continuous basis. In particular, ice tends to accumulate on the cold side of the heat pump systems, thereby requiring frequent defrost cycles. This reduces the overall efficiency of these systems.

U.S. Pat. No. 4,671,077 issued on 9 Jun. 1987 to Paradis discloses a system where the latent heat from freezing water is used as a source of energy. The water can be salt water or polluted water and this water can be purified as a result of the freezing. Although the disclosed system has potential benefits in terms of energy efficiency, there are still many challenges that one would need to overcome before such system can be operated continuously with an optimum efficiency and on a large scale.

Accordingly, there is still room for many improvements in this area of technology.

SUMMARY

In one aspect, there is provided a system for transferring latent heat from a first liquid circuit to a second liquid circuit and for simultaneously separating a content of the first liquid circuit into a purified product and a by-product, the by-product containing concentrated impurities that were separated from the purified product, the system including: a network of conduits containing a refrigerant that is substantially immiscible and unreactive with the content of the first liquid circuit; a first heat exchanger in which the refrigerant is injected directly into the content of the first liquid circuit through at least one nozzle to create frozen liquid pieces containing the purified product and to simultaneously capture the latent heat released upon freezing these liquid pieces; a second heat exchanger in which the refrigerant transfers the latent heat captured from the first liquid circuit to the second liquid circuit, thereby rising a content of the second liquid circuit in temperature; and a refrigerant compressor in fluid communication with the network of conduits, the compressor being located downstream of the first heat exchanger and upstream of the second heat exchanger.

In another aspect, there is provided a system for transferring latent heat from a first liquid circuit to a second liquid circuit and for simultaneously separating a content of the first liquid circuit into a purified product and a concentrated by-product, the system including: a heat pump unit including: an evaporator section where a refrigerant is vaporized at a first pressure directly into the content of the first liquid circuit and where some of the content of the first liquid circuit transfers enough of its latent heat to the vaporized refrigerant to form floating purified frozen liquid pieces, the refrigerant being substantially immiscible and unreactive with the content of the first liquid circuit; a compressor section where the refrigerant at the first pressure is compressed up to a second pressure; and a condenser section where the refrigerant coming from the compressor is put in heat exchange relationship with a content of the second liquid circuit and where the latent heat carried by the refrigerant is transferred to a content of the second liquid circuit before the refrigerant goes back to the evaporator section in a liquefied form; and a pressure vessel enclosing the evaporator section of the heat pump unit.

In another aspect, there is provided a method for purifying a first liquid content and simultaneously heating a second liquid content using latent heat from the first liquid content on a continuous basis, the method including: retrieving enough of the latent heat from the first liquid content to transform a first part of the first liquid content into purified frozen liquid pieces using a vaporized refrigerant injected directly into the first liquid content, the refrigerant being substantially immiscible and unreactive with the first liquid circuit content; separating substantially all of the refrigerant from the first liquid content in which it was injected; separating the purified frozen liquid pieces from a second part of the first liquid content having a concentrated amount of contaminants; raising the second liquid content in temperature using the latent heat retrieved from the first liquid content and carried by the refrigerant; and supplying additional amounts of the first liquid content to maintain a substantially constant level of the first liquid content.

Further details on these aspects as well as other aspects of the proposed concept will be apparent from the following detailed description and the appended figures.

DETAILED DESCRIPTION

Figure 1:
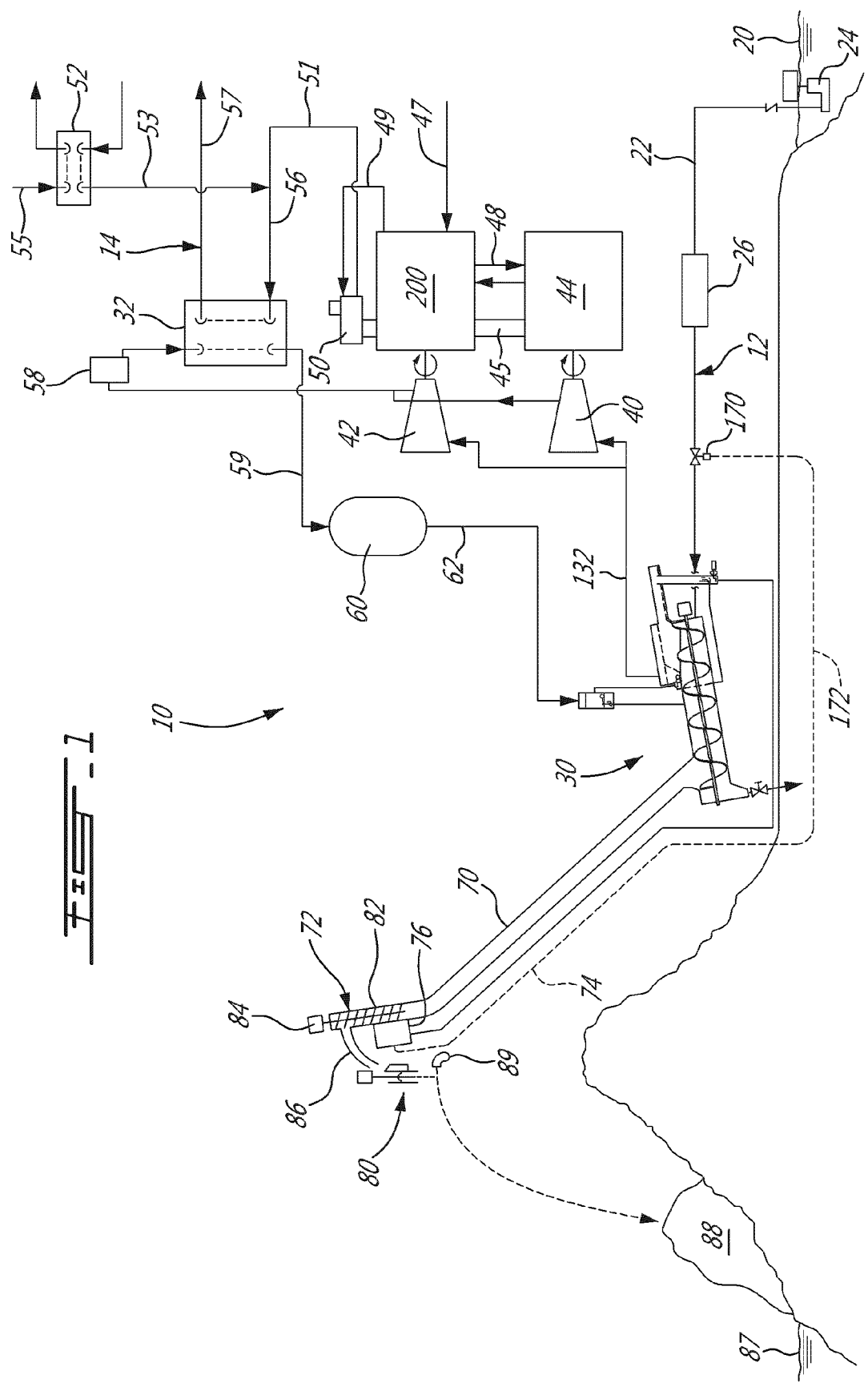
FIG. 1 is a semi-schematic view illustrating an example of a system implementing the proposed concept.

FIG. 1 is a semi-schematic view illustrating an example of a system 10 implementing the proposed concept. The system 10 is used for transferring latent heat from the content of a first liquid circuit 12 to the content of a second liquid circuit 14 in order to simultaneously purify the first liquid content and heat the second liquid content with the latent heat from the purification of the first liquid content.

A first part of the first liquid content is purified when it forms frozen liquid pieces as a result of a phase change. The first liquid content is then divided into a purified product and a by-product, which by-product contains concentrated impurities mixed with a second part of the first liquid content. The system 10 is able to run on continuous basis and in a very efficient manner.

The first liquid content can be water. This water can originate from a natural or artificial body of water, for instance an underground source, a river, a lake, a pond or the sea to name just a few.

The system 10 can thus take advantage of the geothermal energy present from a body of water. It is also possible to use water from a storage tank or water coming directly out of another system. Still, the first liquid content can be an effluent from an industrial process, for instance one used in the paper-making industry, the food industry or the petroleum industry.

In the illustrated example, water in the first liquid circuit 12 comes from a pond 20 in which the water contains fines and other chemical products that were produced when separating oil from tar sands. Using this water as a source of energy in the system 10 will provide an opportunity for purifying this water from at least some of the contaminants therein. The water is supplied through an inlet conduit 22 of the first liquid circuit 12 using a pump 24. This water passes through a vacuum water tank system 26 or another kind of gas removing device capable of removing dissolved gas from the content of the first liquid circuit 12. The vacuum water tank system 26 removes substantially all of the dissolved air in the water to prevent air from contaminating a refrigerant used in the system 10.

As shown in FIG. 1, the first liquid circuit 12 is connected to a thermally-insulated pressure vessel 30 enclosing a first heat exchanger of the system 10. Further details on the pressure vessel 30 are given later in the description.

The second liquid circuit 14 of the illustrated example also contains water. When passing through the system 10, the water of the second liquid circuit 14 is heated and becomes hot water for use in an industrial process, such as a tar sand extraction process or the like. The hot water does not go back to the second liquid circuit 14 afterwards. Other configurations and arrangements are also possible. For instance, when the hot water is used for heating a building or the like, the second liquid circuit 14 can form a closed loop. Many other variants are possible as well.

It should be noted at this point that although water is the only liquid used in the illustrated example, other liquids or mixtures of liquids could be used as well.

The system 10 includes a network of conduits containing a refrigerant. The network of conduits is part of a heat pump unit integrated into the system 10. The heat pump unit includes an evaporator section located in the pressure vessel 30. The evaporator section is where the liquefied refrigerant is injected at a first pressure directly into the water from the first liquid circuit 12 and where some of this water transfers enough latent heat to vaporize the liquid refrigerant into gas bubbles so as to form frozen purified liquid pieces. In the evaporator section, both the water and the refrigerant are subjected to a phase change. Bringing the two in close direct contact at the moment they go through their phase change creates a very efficient heat transfer. The refrigerant is subsequently separated from the unfrozen water and the frozen liquid pieces. The refrigerant will be recycled back into the network of conduits.

The refrigerant used in the heat pump unit is substantially immiscible and unreactive with the content of the first liquid circuit 12. For instance, when the liquid in the first liquid circuit 12 is water, the refrigerant can be a hydrocarbon refrigerant such as butane, isobutane, propane, etc. The hydrocarbon refrigerant can also be a mixture of two or more hydrocarbons in order to obtain a specific evaporating pressure. Other refrigerants can be used as well.

The heat pump unit further includes a compressor section where the refrigerant coming from the evaporator section at the first pressure is compressed up to a second pressure. It also includes a condenser section where the refrigerant coming from the compressor section is put in heat exchange relationship with the water of the second liquid circuit 14. The refrigerant then becomes a liquid as a result of another phase change. This second phase change of the refrigerant releases an important quantity of latent heat that is transferred to the content of the second liquid circuit 14. The refrigerant goes back towards the evaporator section afterwards. The condenser section defines the second heat exchanger of the system 10. The second heat exchanger is schematically depicted at 32.

In the illustrated example, the compressor section includes two distinct compressors 40, 42 mounted in parallel, each driven by a different motor arrangement. Using only one compressor or even more than two compressors mounted in parallel or in series is also possible. Both compressors receive the gaseous refrigerant from the evaporator section in the pressure vessel 30. The first and/or the second compressor 40, 42 can be driven by a corresponding electric motor or another available source of mechanical power.

In the illustrated example, the first compressor 40 is driven by an internal combustion engine or a gas turbine engine. The engine is schematically depicted in FIG. 1 at 44.

Figure 2:
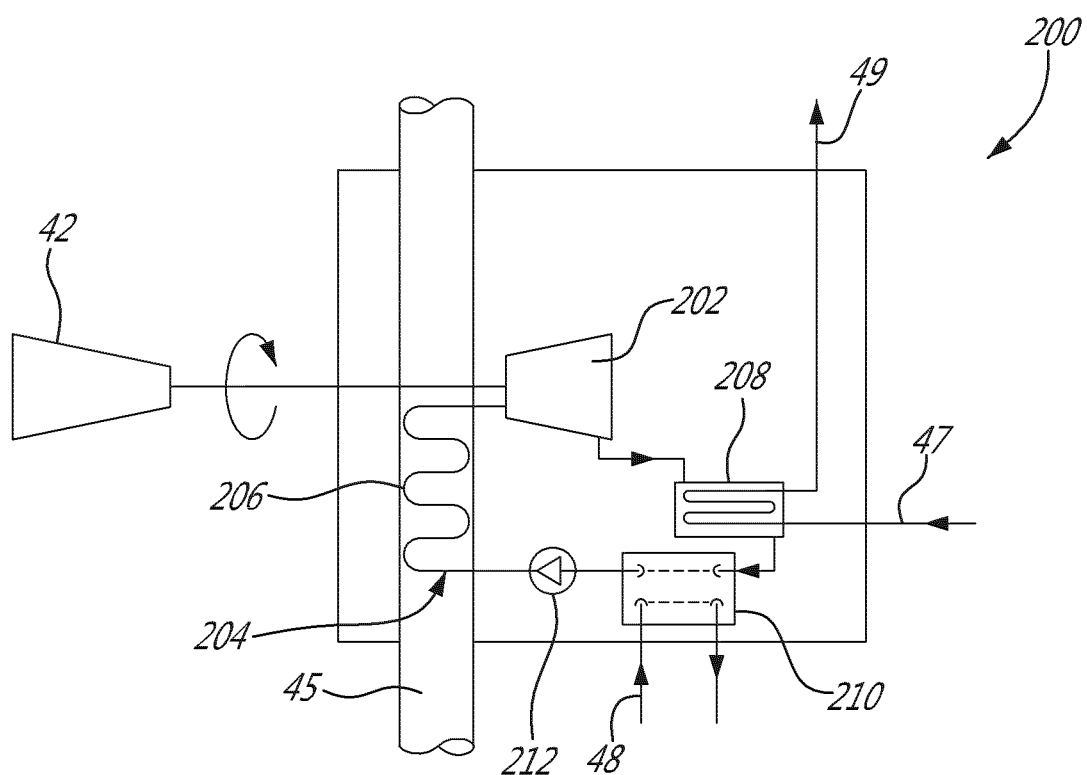
FIG. 2 is a semi-schematic view illustrating an example of the interior of the Rankine cycle device shown in FIG. 1.

The second compressor 42 of the illustrated example is driven by a Rankine cycle device 200. FIG. 2 is a semi-schematic view illustrating an example of the interior of the Rankine cycle device 200 shown in FIG. 1. This Rankine cycle device 200 includes a steam turbine 202 connected to an independent closed loop fluid circuit 204 in which flows a fluid, for example water, transformed into steam upstream of the steam turbine 202. For better efficiency at lower temperatures, other fluids can also be used, for instance hydrocarbons, halocarbons, etc. The fluid circuit 204 circulates the fluid into a boiler 206 receiving heat from the hot exhaust gases of the engine 44 circulating through a chimney 45. The boiler 206 transforms the fluid into the steam for use in the steam turbine 202. The fluid at the outlet of the steam turbine 202 is sent to a condenser 208 that cools the fluid using fresh water supplied through a fresh water inlet conduit 47. The condenser 208 warms the fresh water, which then exits the condenser through a conduit 49 as warm fresh water.

The illustrated example also includes another independent closed loop fluid circuit 48 coming from the engine 44. This circuit 48 is connected to the cooling jacket of the engine 44. It thus captures waste heat from the engine 44. It is connected to another heat exchanger 210 in the Rankine cycle device 200 to preheat the fluid in the fluid circuit 204 coming from the condenser 208. A pump 212 is provided to circulate the fluid in the fluid circuit 204.

As shown in FIG. 1, the system 10 also includes a heat exchanger 50 receiving the warm fresh water from the conduit 49. In the heat exchanger 50, some of the remaining sensible and latent heat in the combustion gases from the engine 44 are transferred to the warm fresh water, thereby increasing its temperature even more and increasing the overall energy efficiency of the system 10.

When leaving the heat exchanger 50 through a conduit 51, the warm fresh water is sent towards the second heat exchanger 32 and is mixed along the way with additional fresh water coming from another heat exchanger 52 through a conduit 53. The additional fresh water is preheated using a waste energy source flowing in a conduit 55. The conduit 56 is connected to the inlet of the second heat exchanger 32 and the content therein forms the content of the second liquid circuit 14 in the system 10. The conduit 57 is connected to the outlet of the second heat exchanger 32 and sends the hot water where it is needed.

In the illustrated example, the refrigerant leaving the compressor section passes into an air/oil separator 58 before entering into the second heat exchanger 32. Also, the refrigerant leaving the second heat exchanger 32 in the conduit 59 is sent to an accumulator 60, from which the refrigerant will be directed to the pressure vessel 30 using a conduit 62 to repeat the cycle.

The thermally-insulated pressure vessel 30 mainly includes two portions. The first portion of the pressure vessel 30 is where frozen liquid pieces are created by the direct injection of the refrigerant. It is thus at the first pressure. Although the first pressure maintained inside the first portion of the pressure vessel 30 is generally much lower than the second pressure at the output of the compressors, the first pressure can sometimes be significantly higher than the atmospheric pressure. It can also be lower than the atmospheric pressure in some designs. One challenge is thus to retrieve the frozen liquid pieces out of the pressure vessel 30 through an outlet while still maintaining the first pressure therein. A solution found to this challenge was to provide the pressure vessel 30 with an elongated and thermally-insulated water column 70 and to collect the frozen liquid pieces at an outlet located at an upper end 72 of the obliquely-disposed water column 70. The water column 70 constitutes the second portion of the pressure vessel 30.

In the illustrated example, the first pressure is higher than the atmospheric pressure outside the pressure vessel 30. The water column 70 is designed be high enough so as to compensate for the pressure differential between the first pressure and the atmospheric pressure. The weight of the water thus counterbalances the pressure differential and the upper end 72 of the water column 70 can thus remain exposed to the atmospheric pressure.

The frozen liquid pieces float at the surface of the unfrozen water inside the pressure vessel 30. Once they are inside the water column 70, they rise by themselves towards its upper end 72. From there, they are directed to an ice crusher 80 using a device for evacuating the frozen liquid pieces. This device can be for instance an auger 82, as shown. The auger 82 can be rigid or flexible, depending for instance whether the interior of the water column 70 is straight or curved. The auger 82 is powered by a motor 84 in the illustrated example. Other kinds of device for evacuating the frozen liquid pieces can be used as well.

The frozen liquid pieces retrieved out of the water column 70 are sent into a chute 86 directing them into the ice crusher 80. The ice crusher 80 can reduce the frozen liquid pieces into a snow-like material, for instance using blades revolving at high speeds. The snow-like material then falls below the ice crusher 80 and eventually forms wet snow stacks 88, as shown in FIG. 1. Crushing the frozen liquid pieces increase the overall contact surface of the purified product with the surrounding air and/or rain water, thereby making it easier to melt the product into liquid water that is substantially purer than the water in the inlet conduit 22 of the first liquid circuit 12. An air blower 89 can be provided to push the falling snow-like material where needed, for instance at the bottom of a hill adjacent to a lake 87 or another body of water.

The water column 70 is also useful for decanting the contaminants in the unfrozen water. In use, most contaminants will to fall by gravity towards the bottom of the pressure vessel 30. However, a relatively wide water column 70 will give the opportunity to contaminants carried away by the flow of frozen liquid pieces to find their way to the bottom. Still, the water column 70 is also useful for precooling the unfrozen water just before transforming some of it into the frozen liquid pieces. As the frozen liquid pieces rise, the water in the water column 70 will become increasingly cooler due to an exchange of sensible heat. This liquid water will be used for making the next frozen liquid pieces. The water is sent back to the first portion of the pressure vessel 30 through a conduit 74. A plenum 76 is provided on the side of the water column 70 to separate the unfrozen water from the frozen liquid pieces. This prevents frozen liquid pieces from plugging the conduit 74. It should be noted that although the plenum 76 is located near the upper end 72 in the illustrated example, it is possible to retrieve the water from somewhere below along the water column 70.

If desired, the water flowing in the conduit 74 can be used for other purposes, for instance for cooling a building or an industrial process.

It should be noted that the height of the water column 70 can be reduced by using various possible alternative arrangements. For instance, one can use an arrangement involving spaced-apart traps (not shown) provided along the water column 70 to retrieve the frozen liquid pieces. The first pressure inside the first portion is maintained by opening only one trap at a time. Other arrangements are possible as well. Furthermore, if the first pressure is lower than the atmospheric pressure, the height of the water column 70 would be significantly reduced compared to what is shown in FIG. 1 since the upper end 72 would be located near or even below the normal water level 104.

Figure 3:
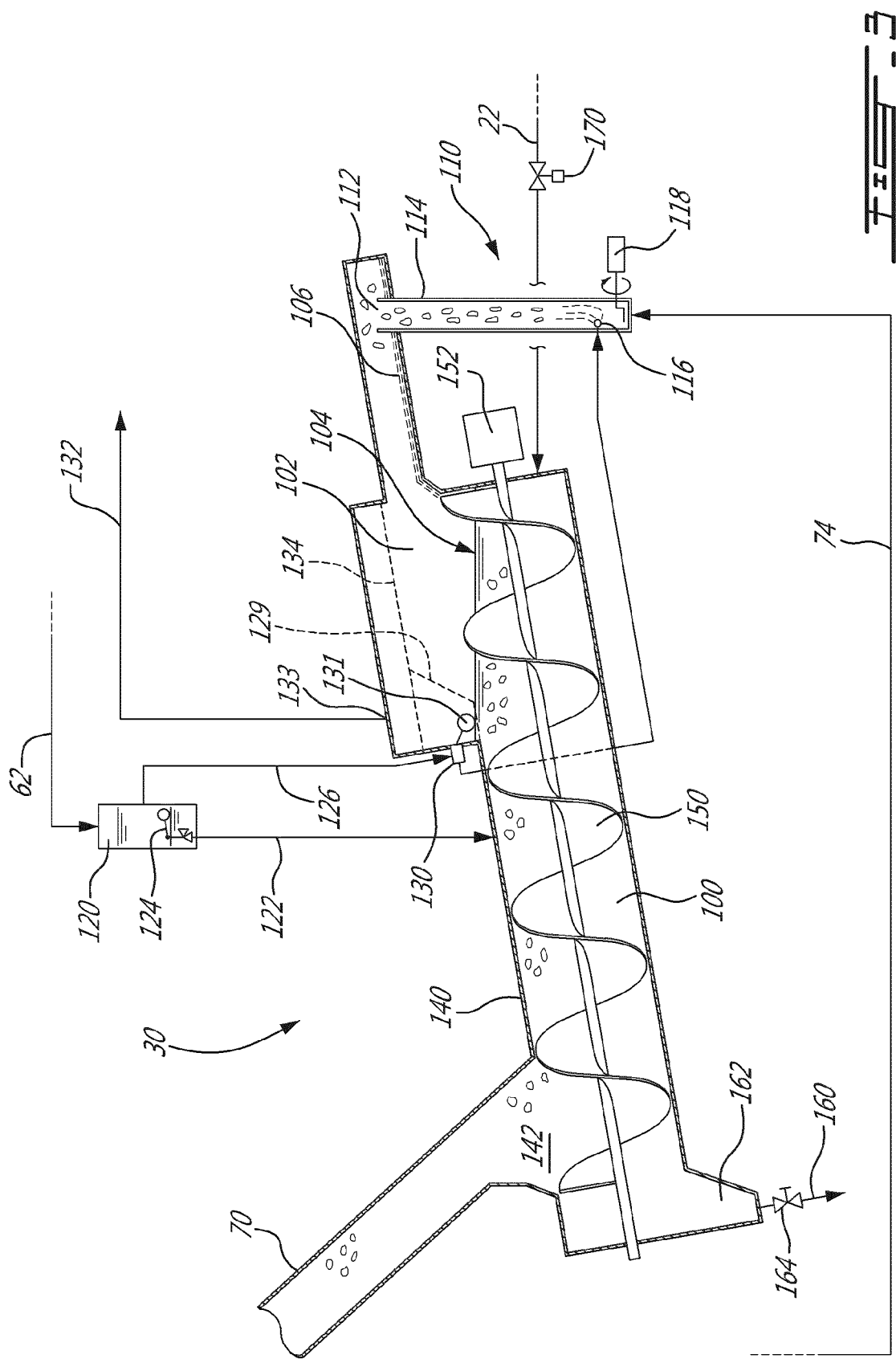
FIG. 3 is a semi-schematic view illustrating an example of the interior of the pressure vessel in the system shown in FIG. 1.

FIG. 3 is a semi-schematic view illustrating an example of the interior of the pressure vessel 30 in the system 10 shown in FIG. 1. However, only the bottom end of the water column 70 is visible in FIG. 3.

As can be seen in FIG. 3, the first portion of the pressure vessel 30 encloses a main liquid-containing chamber 100 and a plenum chamber 102 that is located above the main chamber 100. The main chamber 100 has an upper end in direct fluid communication with a bottom end of the plenum chamber 102. The main chamber 100 is filled with the water from the first liquid circuit 12 up to a normal liquid level 104. The normal liquid level 104 defines the boundary between the upper end of the main chamber 100 and the bottom end of the plenum chamber 102.

In the illustrated example, the frozen liquid pieces are formed in an ice maker 110 that is part of the first portion of the pressure vessel 30. The ice maker 110 has an upper discharge end 112 into the plenum chamber 102. This ice maker 110 includes an elongated vertically-extending pipe 114 filled with water coming from the conduit 74.

In use, the refrigerant is maintained under conditions of temperature and pressure which permit the refrigerant to expand, vaporize and move upwardly through the water while a multitude of small frozen liquid pieces are created. Thus, as the liquid refrigerant is injected directly into the water through one or more nozzles 116 and is subjected to a sudden drop in pressure, its temperature falls below the freezing temperature of water. However, since the refrigerant has a boiling temperature that is well below 0° C., the refrigerant vaporizes and is subjected to a phase change. This creates the refrigerant bubbles in the water and the capture of latent heat turns some of the water into the frozen liquid pieces. Furthermore, the refrigerant bubbles push the mixture of unfrozen water, frozen liquid pieces and refrigerant up.

The nozzle or nozzles 116 are oriented substantially perpendicularly with reference to the incoming flow of water. This water flows upwardly from an inlet located at the bottom end of the pipe 114 of the ice maker 110. New frozen liquid pieces are formed as the liquid water, the vaporized refrigerant and other newly-formed frozen liquid pieces rise into the pipe 114. Once they reach the upper discharge end 112, they pour out into an upper part of the plenum chamber 102. An icicle cutter device 118 can be provided at the bottom of the pipe 114 to prevent ice from building on or around the nozzle or nozzles 116.

If desired, the upper discharge end 112 of the pipe 114 can be located on the bottom of the main chamber 100 right under the plenum chamber 100.

It should be noted at this point that regardless of the fact that the water supplied in the ice maker 110 can be near its freezing temperature, a substantial amount of latent heat can still be captured from it. The reason is that this latent heat will come from the phase change of the water.

Before going through the nozzle or nozzles 116, the liquefied refrigerant from the conduit 62 passes into a water/refrigerant separator 120 in which liquid water is separated from the liquefied refrigerant. The presence of water with the refrigerant is due to the fact that small amounts of water are carried by the gaseous refrigerant when it leaves the plenum chamber 102 through a refrigerant outlet of the pressure vessel 30. This water could potentially freeze and plug the refrigerant circuit immediately upstream of the nozzle or nozzles 116 if it is not removed. The condensed water is sent back inside the pressure vessel 30 using a dedicated conduit 122. A float valve 124 prevents the liquefied refrigerant from entering the conduit 122 if not enough water is present to prevent it. The refrigerant leaving the separator 120 is channeled into a conduit 126.

In the illustrated example, a float valve 130 located adjacent to the normal water level 104 regulates the flow of refrigerant to the ice maker 110 using a float 131. This way, if the water level is too low, the flow of refrigerant can be interrupted so as to prevent the refrigerant from going into the main chamber 100 and possibly reaching the water column 70. A screen 129 is provided to prevent frozen liquid pieces from accumulating around the float 131 and make it defective.

As can be seen in FIG. 3, the upper discharge end of the pipe 114 can be located above the normal water level 104 of the main chamber 100. The unfrozen water and the frozen liquid pieces coming out of the ice maker 110 are directed to the main chamber 100 using an inclined surface 106 of the plenum chamber 102. This gives time for any refrigerant still trapped in the unfrozen water and/or adhering to the frozen liquid pieces to be separated from them. The unfrozen water and the frozen liquid pieces eventually fall into the main chamber 100 and the frozen liquid pieces will initially float at the normal water level 104.

The refrigerant coming inside the plenum chamber 102 is retrieved out of the pressure vessel 30 from a refrigerant outlet 133 that is in fluid communication with a conduit 132 channeling the refrigerant towards the compressor section. A screen separator 134 can be provided on the inside to prevent unfrozen water and frozen liquid pieces from plugging the refrigerant outlet 133.

As can also be seen in FIG. 3, the main chamber 100 includes an upper interior wall 140 that is configured and disposed to form a downwardly slanted path for the frozen liquid pieces. Still, the bottom end of the water column 70 is made in fluid communication with the upper interior wall 140 of the main chamber 100 using a passageway 142 that is located downstream of the downwardly slanted path for the frozen liquid pieces. Since the passageway 142 is beneath the normal liquid level 104 when the main chamber 100 is filled with water, there will be no direct path for the gaseous refrigerant between the plenum chamber 102 and the passageway 142.

In use, the frozen liquid pieces are conveyed along the downwardly slanted path into the passageway 142 using a mechanized arrangement. In the illustrated example, this arrangement includes an auger 150 driven by a motor 152. Rotating the auger 150 can push the frozen liquid pieces along the downwardly slanted path and then into the passageway 142, from which they will float towards the upper end 72 of the water column 70. The auger 150 also acts as a pump to push the unfrozen water towards the water column 70, from which it will be recycled through the conduit 74 that feeds the ice maker 110 by gravity. Other arrangements can be used as well, for instance a conveyor, a rope with a disk assembly, etc. It is also possible to use a pump mounted along the conduit 74.

Water in the main chamber 100 becomes increasingly concentrated with impurities as the purified frozen liquid pieces enter the water column 70 and their impurities are left behind. The impurities tend to accumulate at the bottom of the main chamber 100 by gravity. These impurities and the water at the bottom form the concentrated by-product. The pressure vessel 30 includes an outlet 160 provided at a substantially downmost location 162 within the bottom end of the main chamber 100 to retrieved the by-product out of the pressure vessel 30. The flow of the by-product through the outlet 160 is regulated by a valve 164.

The supply of water coming from the first liquid circuit 12 can be controlled using, for instance, a float sensor or the like at the upper end 72 of the water column 70. This way, the flow of the first liquid circuit 12 can be regulated to maintain the system 10 balanced. In the illustrated example, as shown in FIG. 1, an actuated valve 170 is provided on the first liquid circuit 12 and the water is supplied directly through an inlet of the main chamber 100. The actuated valve 170 can be connected to the float sensor using a wired connection. The wired connection is schematically depicted in FIG. 1 at 172.

As can be appreciated, the present concept provides a method for purifying a first liquid content and for simultaneously heating a second liquid content using latent heat from the first liquid content on a continuous basis. In this method, enough of the latent heat from the first liquid content is retrieved to transform a first part of the first liquid content into purified frozen liquid pieces using a vaporized refrigerant injected directly into the first liquid content, the refrigerant being substantially immiscible and unreactive with the first liquid circuit content. Substantially all of the refrigerant is separated from the first liquid content in which it was injected. The purified frozen liquid pieces are separated from a second part of the first liquid content containing a concentrated amount of contaminants. The second liquid content rises in temperature using the latent heat retrieved from the first liquid content and carried by the refrigerant. Additional amounts of the first liquid content are supplied to maintain a substantially constant level of the first liquid content.

If desired, the content of the first liquid circuit 12 can be pre-filtered, for instance using filters, centrifugal machines, mechanical vapor compression systems and/or reverse osmosis systems.

Overall, the proposed concept provides designers with opportunities to create highly efficient systems and methods where the latent heat extracted from the purification is immediately employed to a useful purpose. The systems and methods are also capable of being run on a continuous basis.

The present detailed description and the appended figures are meant to be exemplary only. A skilled person will recognize that variants can be made in light of a review of the present disclosure without departing from the proposed concept.

The invention claimed is:

1. A system for transferring latent heat from a first liquid circuit to a second liquid circuit and for simultaneously separating a content of the first liquid circuit into a purified product and a by-product, the by-product containing concentrated impurities that were separated from the purified product, the system including:
   a network of conduits containing a refrigerant that is substantially immiscible and unreactive with the content of the first liquid circuit;
   a first heat exchanger in which the refrigerant is injected directly into the content of the first liquid circuit through at least one nozzle to create frozen liquid pieces containing the purified product and to simultaneously capture the latent heat released upon freezing these liquid pieces;
   a second heat exchanger in which the refrigerant transfers the latent heat captured from the first liquid circuit to the second liquid circuit, thereby rising a content of the second liquid circuit in temperature; and
   a refrigerant compressor in fluid communication with the network of conduits, the compressor being located downstream of the first heat exchanger and upstream of the second heat exchanger.

2. The system as defined in claim 1, wherein the first heat exchanger includes:
   a first inlet through which the content of the first liquid circuit is supplied to the first heat exchanger;
   a second inlet through which the refrigerant coming from the second heat exchanger is supplied to the at least one nozzle;
   a first outlet from which the frozen liquid pieces are retrieved out of the first heat exchanger;
   a second outlet from which the refrigerant is directed to the refrigerant compressor; and
   a third outlet for retrieving the by-product out of the first heat exchanger.

3. The system as defined in claim 2, wherein the first heat exchanger includes a thermally-insulated pressure vessel, the pressure vessel including:
   a first portion including a main liquid-containing chamber and a plenum chamber, the second outlet of the first heat exchanger being located in the plenum chamber; and
   a second portion including a water column having a bottom end opened into the main chamber of the first portion through a passageway located beneath a normal water level separating the main chamber and the plenum chamber, the water column having an upper end where is located the first outlet of the first heat exchanger.

4. The system as defined in claim 3, wherein the first heat exchanger includes a substantially vertically-extending pipe having an upper discharge end opening into the first portion of the pressure vessel, the at least one nozzle discharging the refrigerant into the pipe.

5. The system as defined in claim 4, wherein the upper discharge end is located in the plenum chamber or on a bottom of the main chamber right under the plenum chamber.

6. The system as defined in claim 4, wherein the pipe includes a bottom inlet receiving a flow of the content of the first liquid circuit from elsewhere in the system, the at least one nozzle being configured and disposed to inject the refrigerant substantially perpendicularly with reference to the flow coming out of the bottom inlet.

7. The system as defined in claim 6, wherein the bottom inlet is connected to the water column through a conduit.

8. The system as defined in claim 7, wherein the water column includes a plenum chamber preventing the frozen liquid pieces from plugging the conduit between the water column and the bottom inlet.

9. The system as defined in claim 4, wherein the system further includes an icicle cutter device located in the pipe, the icicle cutter device being adjacent to the at least one nozzle.

10. The system as defined in claim 3, wherein the system further includes means for moving the frozen liquid pieces from the main chamber into the water column.

11. The system as defined in claim 10, wherein the means for moving the frozen liquid pieces include an auger mechanically connected to a motor.

12. The system as defined in claim 3, wherein the second inlet includes a float valve regulating a flow of refrigerant supplied to the at least one nozzle in response to a variation of an actual water level in the main chamber with reference to the normal water level.

13. The system as defined in claim 3, wherein the pressure vessel includes a device for evacuating the frozen liquid pieces, the device being located at the upper end of the water column immediately upstream of the first outlet of the first heat exchanger.

14. The system as defined in claim 1, wherein at least some of the content of the second liquid circuit is preheated using waste heat from a motor driving the refrigerant compressor.

15. The system as defined in claim 1, wherein the system further includes a gas removing device located upstream of the first heat exchanger, the gas removing device removing dissolved gas from the content of the first liquid circuit.

16. The system as defined in claim 1, wherein the system further includes an ice crusher located downstream of the first outlet of the first heat exchanger and receiving the frozen liquid pieces therefrom.

17. A system for transferring latent heat from a first liquid circuit to a second liquid circuit and for simultaneously separating a content of the first liquid circuit into a purified product and a concentrated by-product, the system including:
- a heat pump unit including:
  - an evaporator section where a refrigerant is vaporized at a first pressure directly into the content of the first liquid circuit and where some of the content of the first liquid circuit transfers enough of its latent heat to the vaporized refrigerant to form floating purified frozen liquid pieces, the refrigerant being substantially immiscible and unreactive with the content of the first liquid circuit;
  - a compressor section where the refrigerant at the first pressure is compressed up to a second pressure; and
  - a condenser section where the refrigerant coming from the compressor is put in heat exchange relationship with a content of the second liquid circuit and where the latent heat carried by the refrigerant is transferred to a content of the second liquid circuit before the refrigerant goes back to the evaporator section in a liquefied form; and
- a pressure vessel enclosing the evaporator section of the heat pump unit.

18. The system as defined in claim 17, wherein the pressure vessel includes:
- a first portion in which are located a main liquid-containing chamber and a plenum chamber that is located above the main chamber, the main chamber including:
  - an upper end in direct fluid communication with a bottom end of the plenum chamber; and
  - an upper interior wall configured and disposed to form a downwardly slanted path for the frozen liquid pieces;
  - the first portion of the pressure vessel having a normal liquid level defining a boundary between the upper end of the main chamber and the bottom end of the plenum chamber;
- a second portion in which is located a water column having an upper end and a bottom end, the bottom end of the water column being in fluid communication with the main chamber using a passageway that is located through the upper interior wall beneath the normal liquid level and downstream of the downwardly slanted path; and
- a by-product outlet provided at a substantially downmost location within the main chamber.

19. The system as defined in claim 18, wherein the pressure vessel includes an auger that is positioned inside the main chamber, the frozen liquid pieces being conveyed along the downwardly slanted path into the passageway upon rotating the auger.

20. The system as defined in claim 17, wherein the first pressure is higher than the atmospheric pressure outside the pressure vessel.

21. A method for purifying a first liquid content and simultaneously heating a second liquid content using latent heat from the first liquid content on a continuous basis, the method including:
- retrieving enough of the latent heat from the first liquid content to transform a first part of the first liquid content into purified frozen liquid pieces using a vaporized refrigerant injected directly into the first liquid content, the refrigerant being substantially immiscible and unreactive with the first liquid circuit content;
- separating substantially all of the refrigerant from the first liquid content in which it was injected;
- separating the purified frozen liquid pieces from a second part of the first liquid content having a concentrated amount of contaminants;
- raising the second liquid content in temperature using the latent heat retrieved from the first liquid content and carried by the refrigerant; and
- supplying additional amounts of the first liquid content to maintain a substantially constant level of the first liquid content.

* * * * *